United States Patent
Meredith et al.

(10) Patent No.: US 10,660,019 B2
(45) Date of Patent: *May 19, 2020

(54) LOCATING PHYSICAL ASSETS VIA NEAR FIELD COMMUNICATION NODES

(71) Applicants: AT&T Mobility II LLC, Atlanta, GA (US); AT&T Intellectual Property I, L.P., Atlanta, GA (US)

(72) Inventors: Sheldon Kent Meredith, Roswell, GA (US); William Cottrill, Canton, GA (US); Brandon B. Hilliard, Woodstock, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/985,450

(22) Filed: May 21, 2018

(65) Prior Publication Data

US 2018/0270736 A1  Sep. 20, 2018

Related U.S. Application Data

(63) Continuation of application No. 14/944,728, filed on Nov. 18, 2015, now Pat. No. 9,980,205.

(51) Int. Cl.
| | |
|---|---|
| *H04W 4/80* | (2018.01) |
| *H04W 48/10* | (2009.01) |
| *H04W 8/00* | (2009.01) |
| *H04W 4/029* | (2018.01) |
| *G01S 5/02* | (2010.01) |
| *H04L 29/08* | (2006.01) |

(52) U.S. Cl.
CPC .............. *H04W 48/10* (2013.01); *G01S 5/02* (2013.01); *H04W 4/029* (2018.02); *H04W 4/80* (2018.02); *H04W 8/005* (2013.01); *H04L 67/16* (2013.01)

(58) Field of Classification Search
CPC ....... H04W 48/10; H04W 4/80; H04W 8/005; H04W 4/02; G01S 5/02; H04L 67/16
See application file for complete search history.

(56) References Cited

U.S. PATENT DOCUMENTS

| | | |
|---|---|---|
| 6,885,288 B2 | 4/2005 | Pincus |
| 7,518,502 B2 | 4/2009 | Austin et al. |
| 7,653,394 B2 | 1/2010 | McMillin |
| 8,255,358 B2 | 8/2012 | Ballew et al. |
| 8,417,215 B2 | 4/2013 | Baldus et al. |
| 8,903,416 B1 * | 12/2014 | Perkins .................. H04L 67/12 455/456.1 |
| 9,000,915 B2 | 4/2015 | Culpepper et al. |
| 9,153,120 B1 | 10/2015 | Xiao et al. |
| 2008/0020782 A1 | 1/2008 | Nasser et al. |

(Continued)

*Primary Examiner* — Marcus Hammonds (57) ABSTRACT

An example device for processing a query for a physical asset includes a processor and a computer-readable medium storing instructions which, when executed by the processor, cause the processor to perform operations. The operations may include receiving a query for a physical asset from a requesting device, determining a near field communication node that detects the physical asset, and providing to the requesting device an identification of a communication device that is associated with the near field communication node in response to the query.

20 Claims, 3 Drawing Sheets

(56) References Cited

U.S. PATENT DOCUMENTS

| | | |
|---|---|---|
| 2010/0039284 A1 | 2/2010 | Hall et al. |
| 2011/0037565 A1 | 2/2011 | Skirble et al. |
| 2012/0179585 A1 | 7/2012 | Guzzo et al. |
| 2013/0124463 A1 | 5/2013 | Lee et al. |
| 2014/0221003 A1 | 8/2014 | Mo et al. |
| 2015/0122883 A1* | 5/2015 | Del Toro ................ G06F 16/00 235/380 |

* cited by examiner

LOCATING PHYSICAL ASSETS VIA NEAR FIELD COMMUNICATION NODES

This application is a continuation of U.S. patent application Ser. No. 14/944,728, filed Nov. 18, 2015, now U.S. Pat. No. 9,980,205 which is herein incorporated by reference in its entirety.

Embodiments of the present disclosure relate to physical asset tracking, and more specifically to systems for tracking physical assets via a network of near field communication nodes.

BACKGROUND

Many hospitals have limited quantities of expensive mobile equipment that is shared among various departments and hospital staff. Sometimes, there is an emergency that requires the portable equipment, but if the equipment is not where it is supposed to be, valuable time can be wasted in attempting to locate the equipment. Similarly, manufacturing facilities or other types of industrial facilities may possess small numbers of specialized, and typically expensive portable equipment that staff may spend significant time trying to locate.

SUMMARY

The present disclosure describes devices, computer-readable media and methods for processing a query for a physical asset. For example, in one embodiment a device includes a processor and a computer-readable medium. The computer-readable medium stores instructions which, when executed by the processor, cause the processor to perform operations. The operations may include receiving a query for a physical asset from a requesting device, determining a near field communication node that detects the physical asset, and providing to the requesting device an identification of a communication device that is associated with the near field communication node in response to the query.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

In one example, the present disclosure includes a network of nodes, e.g., near field communication (NFC) nodes deployed throughout a building or other environments for portable equipment/physical asset tracking. Examples of the present disclosure may track various types of assets, such as lifesaving equipment in a hospital, resources necessary to recover critical systems from network outage conditions, testing equipment in a manufacturing facility, humans in a care facility, e.g., patients, or doctors or other specialists, service animals, and so forth. For instance, a problem faced by many hospitals is that there is a limited number of expensive portable medical assets. Sometimes, there may be an emergency that requires the asset, but if the asset is not where it is supposed to be, valuable time can be wasted in attempting to locate the medical asset.

As described herein, a near field communication (NFC) node or NFC device may refer to various components, including: radio frequency identification (RFID) readers, interrogators, transceivers, and passive or active tags, Institute of Electrical and Electronic Engineers (IEEE) 802.15.4 devices, e.g., ZigBee devices, Bluetooth low energy (BLE) beacons and transceivers, Wireless Fidelity (Wi-Fi) routers and transceivers, Bluetooth transceivers, or other near-field communication (NFC) devices of a similar nature.

In one example, the present disclosure includes a desktop application or an application for a mobile device that allows a user to submit a query for the physical asset to a central server connected to a network of NFC nodes. The asset may be equipped such that the location of the asset may be tracked. For example, the asset may be outfitted with a near field communication (NFC) device. Multiple NFC nodes may also be distributed throughout a building, campus, or other environments. The location of each physical asset may be tracked in relation to NFC nodes in the network. The NFC nodes may be arranged to operate as a mesh network to detect the physical asset via the physical asset's NFC device and to relay a message regarding the detection of the asset to the server. In one example, NFC nodes may also obtain status information of the asset, such as whether the asset is plugged into an outlet or other power source, whether the asset is fully charged, whether the asset is turned on or being used, etc., and relay this status information to the server as part of a same or a different message. For instance, any NFC node that detects the asset may report the detection to the server. In one example, the server may maintain a database for storing data regarding NFC nodes, assets, and communication devices in the tracking environment that may be used to request assistance in locating and/or retrieving an asset. In one example, the server may send a list of tracked assets to NFC nodes in the network. The NFC nodes may then retain the list for comparisons to observed asset transmissions.

An NFC node detecting an asset may broadcast a message indicating the detection via an NFC transmission. The message may be received by a number of other NFC nodes which may rebroadcast the message. In one example, the server may receive the message directly from an originating NFC node or from a rebroadcasting NFC node. In other words, the server may also be equipped for NFC exchanges. For instance, the server may include an NFC transceiver. However, in another example, the network may include one or more hub NFC nodes, which may engage in NFC exchanges with other NFC nodes and which may also communicate with the server via non-NFC links, such as via a wired/wireless local area network (LAN), via a cellular network, etc. Thus, NFC nodes may continue to rebroadcast a message until the message is received by a hub NFC node that passes the message to the server.

An NFC node reporting a detection of an asset via a broadcast message may relay further information to the server, such as communication devices that are available near the NFC node, and hence near the asset. For instance, the NFC node may also report detection of one or more mobile communication devices of users who may be located near the asset that is detected. For example, a doctor, nurse, or other hospital staff member's personal mobile communication device may be equipped with an NFC transceiver via which the mobile communication device may be detected by an NFC node. In another example, the NFC node may be configured to store a phone number near the location in which the NFC node is deployed, such as a phone number or extension of a nursing desk that is closest to the location of the NFC node. Thus, in one example the NFC node may broadcast this phone number/extension in addition to other information pertaining to the detection of an asset. Alternatively, or in addition, the server may store in a database record for the NFC node an association between the NFC node and a nearby fixed-location communication device.

In either example, the server may provide a response to a query for an asset with contact information for one or more fixed or mobile communication devices that are located near an NFC device that detects the asset. In this way, the user may seek assistance from those who may already be in the vicinity of the asset. For instance, a portable medical scanner may be needed immediately by a doctor who is engaged with a patient, but the portable medical scanner may be located in an entirely different part of the hospital that may take several minutes of walking to reach. If the doctor can locate another staff member who is already near the portable medical scanner and have the staff member bring the portable medical scanner to the doctor, the time to get the portable medical scanner to where it is needed may be cut by up to half or more. In addition, the doctor may spend this time engaged in other tasks, such a continuing work on the patient in preparation for the arrival of the portable medical scanner.

In one example, the server maintains a database of assets, NFC nodes, and mobile communication devices for responding to a query for an asset. For instance, a database record for an asset may be maintained by the server indicating an NFC node with a highest signal strength observed for the asset, or a list of a plurality of NFC nodes with the highest signal strengths observed, a location of the NFC node(s), e.g., room numbers, floors in a building, coordinate positions, etc., numbers for reaching communication devices located near the NFC node(s) and the identities of any individuals associated with such communication devices, status information of the asset, physical parameters of an environment near the asset, and so forth. In one example, the database may further include availability status information of mobile communication devices or fixed communication devices. For instance, where the network of NFC nodes is for use in a hospital environment, the server may store in the database information regarding who is on-call and who is not, such that only on-call staff member's mobile communication devices may be tracked. Similarly, staff members who are engaged in surgical tasks or other tasks from which the individuals should not be interrupted may provide indicators to prevent their mobile communication devices from being identified in response to a query for a nearby asset. In other non-hospital examples, the server may store information regarding users who are on-duty and not on-duty, for instance.

Thus, the server may utilize this database to respond to queries from any authorized querying application existing on a mobile of fixed computing device. Accordingly, a requestor may search for the current location of an asset by identifier or by descriptive keywords which may result in a scored/ordered set of possible assets matching the description being returned to the requestor. Since the server stores or has access to a database with configuration information for each NFC node, such as a floor, a room number, a telephone number for the room or in a nearby hallway, etc., any currently detected mobile communication devices near the asset and various information, such as asset status information, can be sent to the requesting device in response to a query. In one example, a user interface of the requesting device may provide a location of the asset on a map, as an alternative or in addition to textual information regarding a location of the asset. Furthermore, it is possible that an asset is off-site being repaired or calibrated. In this case, an entry for the asset may be updated in the database to indicate that the asset is off-site. Therefore, a query for the asset may return information that the asset is off-site. This may prevent the requestor from spending valuable time continuing to search for an asset that is clearly not available.

In one example, multiple NFC nodes may detect an asset and broadcast a set of messages reporting detection of the asset for delivery to the server. The same NFC nodes may also detect one or more mobile communication devices in the vicinities of the respective NFC nodes and broadcast this information in the same set or a different set of messages for delivery to the server. In response to a query for the asset, the server may then provide the locations of all or a portion of the NFC nodes that detected the asset, phone numbers and/or extension numbers of all or a portion of a set of fixed or mobile communication devices associated with the respective NFC nodes, and so forth. In another example, the server may provide a localized estimate of a location of the asset based upon the NFC nodes that are detecting the asset. For example, the server may triangulate or otherwise infer or calculate a location of the asset based upon the locations of the NFC nodes that are detecting the asset. In another example, the NFC nodes detecting the asset may report a signal strength in connection with detecting the asset. For example, as mentioned above, the asset may be outfitted with an NFC device. The NFC device may be built-into the asset, or may be attached or affixed to the asset. An NFC node may therefore detect an asset by detecting the NFC device of the asset. Insofar as the detection involves NFC transmissions and receptions, the NFC node may record a signal strength of the NFC device of the asset (communications between an asset's NFC device and an NFC node are described in greater detail below). The server or the asset may then compare the recorded signal strengths of the asset's NFC device as reported by the respective NFC nodes. An NFC node reporting the greatest detected signal strength may be determined by the server to be the NFC node that is located closest to the asset. The server may then provide the location of this NFC node, phone numbers or similar contact information for any nearby communication devices, status information of the asset and/or other information, such as environmental conditions near the asset or NFC node, in response to a query for the asset.

The NFC device of an asset can be built into the asset, or may be a separate device that is attached to the asset. The NFC device may receive power to broadcast and receive NFC messages from various sources, such as from the asset, from plug-in wall power, from a battery, from a solar power unit, etc. In one example, the NFC device may comprise a passive or active NFC tag that simply stores and provides an identifier of the asset in response to a query from an NFC reader, e.g., an NFC node attempting to detect the asset. For example, the NFC device may comprise a radio frequency identification (RFID) tag. In another example, the NFC device may be integrated with the asset to obtain further parameters of the asset and/or to detect and report one or more physical parameters relating to the environment in which the asset is located. For example, the asset may also transmit via the NFC device information about the asset's status, such as whether the asset is in use, whether the asset is receiving wall power, and so forth.

In one example, NFC nodes in the network may be configured to operate with a maximum number of rebroadcasts/retransmissions per message. For instance, the network of NFC nodes may be designed and/or deployed such that the server or a hub NFC node will be reached in a maximum of four transmissions. Thus, the maximum number of rebroadcasts may be set to five rebroadcasts, or to six rebroadcasts to provide a margin of error, for example. In one example, the message may include a counter, and each NFC node rebroadcasting the message may increase the counter by one. When an NFC node receives the message and the counter exceeds a threshold, the NFC node may then drop the message. In another example, the network of NFC nodes may be deployed and test messages propagated throughout the network to determine the maximum number of rebroadcasts for a message from an NFC node to reach the server or a hub NFC node. In another example, an NFC node originating a message regarding detection of an asset and NFC nodes receiving and rebroadcasting the message may append respective NFC node identities to the message. If the message is received via a rebroadcast at any NFC node that either originated the message or already rebroadcast the message, the NFC node may inspect the message, determine that the NFC node originated or previously rebroadcast the same message, and discard the message when it is received for the second time (or third time, etc.). Alternatively, or in addition, a message may be time stamped by an originating NFC node and the message may be discarded by any NFC node receiving the message after a certain duration of time has passed. For instance, it may be assumed that the message has already reached a hub NFC node and been forwarded to the server after a threshold duration of time has passed. In another example, an NFC node may keep a history of processed messages with a message identifier, an originating NFC node identifier, and an origination time stamp for each message. Any message received that matches a message that has already been processed by the NFC node may be discarded.

Using the foregoing examples, NFC nodes may be deployed in any arrangement throughout a building or other environments and messages will find a way to the server without optimal routing being configured, so long a sufficient maximum number of rebroadcasts is provided to guarantee that a message will be routed to a hub NFC node and/or to the server, and so long as NFC nodes are deployed with sufficient proximity such that each NFC node, including the hub NFC nodes, has at least one communication path to the server, either via a direct path or via one or more intermediate/rebroadcasting NFC nodes, via one or more hub NFC nodes, and so forth. To illustrate, a large hospital may have four wings on a single floor with 50 room per wing. In one arrangement, 13 NFC nodes per wing may be deployed with a single hub NFC node in the middle of the wings wired over Ethernet to the server. Thus, it might take 13 hops from the furthest NFC node to the hub NFC node assuming message rebroadcasts do not skip NFC nodes. If instead a hub NFC node is provided centrally in each wing of the building, with a total of four hub NFC nodes, the maximum number of rebroadcasts may be seven hops before reaching a hub NFC node. This knowledge allows a maximum number of rebroadcasts to be set for the network such that messages do not propagate entirely across the other wings or throughout multiple floors and wings of a large facility.

In one example, NFC nodes may periodically send verification messages and receive responses from the server to confirm that at least one path exists from the NFC node to the server. In one example, the server may send out requests to NFC nodes to locate an asset in response to a query from a submitting device. Alternatively, or in addition, the server may periodically request NFC nodes to attempt to detect one or more assets and to report back to the server with any detections. For example, the server may keep an ongoing record of asset locations, e.g., NFC nodes detecting an asset. Thus, when a query for the asset is received, the server may respond with information from the last known location, such as a location of the last NFC node detecting the asset, an identity of the last NFC node detecting the asset, a phone number/extension of a communication device deployed near the NFC node, the mobile communication devices most recently detected by the NFC node (and thus near the last detected location of the asset), and so on.

In one example, it is not necessary to know the location of an NFC node. Rather, it is sufficient to know that a particular NFC node has detected an asset, and that at least one communication device is also near the NFC node that can be contacted to request that a user of the communication device locate the asset and/or retrieve the asset and bring it to another location.

In one example, NFC nodes may operate using low-power, infrequent broadcasts so as to minimize energy expenditure. For instance, the NFC nodes may comprise transceivers that use solar cells, batteries, or the capture of 60 Hz electromagnetic field energy as a power source. Although some or all of the NFC nodes may be wired for NC power and back-end communications, being able to rapidly deploy NFC nodes without needing to wire the NFC nodes may facilitate rapid deployment and use. In one example, an NFC device of an asset may also comprise a low power transceiver to communicate with NFC nodes. In another example, an NFC device of an asset may draw power from the asset or have a separate A/C power connection, for instance. However, in one example, the NFC device may nevertheless be equipped with a battery to ensure that, even if the asset is unplugged from a power source, communications with NFC nodes can be maintained for many days. In addition, in one example, the NFC device may initiate a special message prior to a battery being completely drained, indicating a low battery state. The NFC nodes can communicate among themselves and with assets' NFC devices using spread spectrum coding to maintain usable signal to noise ratios. Low power, spread spectrum coding is suitable for use in connection with the present disclosure insofar as examples relate to slow-moving portable assets and do not include transmissions of large datasets.

To illustrate, a message from an NFC node may involve transmitting alphanumeric digits of an asset identifier, the status of the asset, and an identifier of the NFC node. In one example, a message size of 200 bytes or 1600 bits may be used to convey this information. Using a 16 phase shift keying (PSK) modulation scheme, for instance, four bits are transmitted per symbol. This implies 400 symbols to be transmitted per message. To transmit this message over 100 seconds, this further implies a data rate of four symbols per second. Since NFC nodes within the network may be far apart and comprise high frequency transmitters, achieving solid signal to noise ratio may be achieved using broadband spreading. For example, broadband spreading of 100 MHz may result in a coding gain of $10*\log 10(100e^6/4)=74$ dB. This amount of coding gain on top of the actual power output of an NFC node for inter-node transmissions allows for losses through many walls (e.g., approximately 10-15 dB loss per wall). Thus, in one example, a network of NFC nodes may be deployed where there is less than one NFC node per room of a facility.

In one example, the NFC nodes may transmit on relatively infrequent timeslots within a transmission frame (for instance for tens of microseconds per 15 minute duration). Multiple NFC nodes may have messages to broadcast at the same time. In one example, the timing of broadcasts may be controlled by clocks in the NFC nodes that are synchronized to a master timing signal from the server. In one example, a numbers of hops from an NFC node to the server or to a hub NFC node can be used to infer a time delay for improved clock synchronization. When transmitting, an NFC node may announce the timeslot that it is using to avoid collisions.

In another example, an NFC device of an asset may detect which NFC node or nodes are closest to a location of the asset and initiate a reporting of the asset's location to the server. For instance, an NFC device of an asset may synchronize an internal clock by detect transmissions of various NFC nodes in designated time slots of the transmission frame. Once synchronized, the NFC device of the asset may then operate to measure the signal strengths of transmissions/broadcasts by one or more NFC nodes at the scheduled times. An NFC device of an asset may determine an NFC node having a highest observed signal strength and initiate a reporting to the server. In one example, a transmission by an NFC node may include an identifier of the NFC node, thus allowing the NFC device of the asset to measure the signal strength of the transmission and to identify the transmitting NFC node. As mentioned above, the present disclosure may employ broadband, spread spectrum NFC transmissions. The use of broadband, spread spectrum NFC transmissions may also obviate the effects of frequency-selective fading that could otherwise bias the signal strength measurements. Diversity reception on the NFC device of the asset may also alleviate such conditions.

In one example, the NFC device may initiate a message to the server when the NFC device of the asset determines an NFC node with the highest observed signal strength. For instance, the NFC device may select a timeslot within the frame and transmit a "presence" message announcing the NFC node with the highest observed signal strength. This can occur within a relatively short time period, e.g., within tens of microseconds. In one example, the NFC node with the highest observed signal strength, receiving this message sent by the NFC device of the asset, may then acknowledge the message back to the NFC device of the asset in another prescribed timeslot. If an acknowledgement is not received, the NFC device of the asset can retry sending the presence message on another timeslot, e.g., randomly selected, to the same NFC node for any number of attempts.

In one example, to avoid the possibility of ping-ponging, this sequence is not repeated unless the NFC device of the asset detects a change in the NFC node having a highest observed signal strength. In one example, hysteresis criteria can be established to set a minimum time between the asset sending a presence message and when it detects a new strongest NFC node and/or to set a minimum difference in signal strengths between NFC nodes in order to trigger an announcement of a new strongest NFC node. Alternatively, the asset might retain the "last two" strongest observed NFC nodes which could be on the cusp of an equal-power border and only send a message if the pair changes. In any case, the NFC node with the highest observed signal strength may receive a message from the NFC device of the asset announcing the change. The NFC may then create and/or broadcast a message, or may send a message via a non-NFC path towards the server (if the NFC node is a hub node), reporting that the NFC node is the closest or most proximate to the asset.

Alternatively, or in addition, the NFC device of the asset may transmit a message indicating the NFC node or nodes with the highest signals strength(s) in response to a request from the server that is propagated throughout the network of NFC nodes. For instance, the server may receive a request for the asset and propagate a search request in a message to the various NFC nodes in the network. The NFC node of the asset may then receive the search request via any NFC node in range of the NFC device and respond with a list of one or more NFC nodes with the highest observed signal strengths. In another example, there may be several similar assets, or assets belonging to a particular class of assets that may be identified in a request. For example, a user submitting a query for an asset may be seeking a general type of equipment, e.g., a forklift, and does not care which particular manufacturer, year, model, etc. of the forklift is available. Rather, the user may simply want the closest forklift to a particular location or the first available forklift. Thus, the server may propagate a message comprising search request that is looking for any asset that meets the class description, e.g., a forklift, rather than seeking a location of a specific asset, e.g., as identified by a unique identifier. In another example, the server may maintain aging information in the database with respect to location information of an asset. If the server sends out a query for a class of assets, it may specify only assets for which the aging information indicates that a location update has not been received for more than a certain period of time. This may avoid the network of NFC nodes being flooded with messages regarding assets with locations that have recently been updated and which are most likely to be accurate in the database.

In some cases, the asset may sit in the same location detecting the same NFC nodes for weeks or months and may not otherwise send any presence messaging. In one example, the NFC device of the asset may still periodically transmit messages indicative of the strongest detected NFC node, or nodes, to prove that the asset's transceiver/NFC device is functioning. For example, the NFC device of the asset may transmit a message with this information at a minimum of once per day. An NFC device operating under such conditions may have low energy consumption if it measures NFC node broadcasts for microseconds over periods of tens of minutes and then only sends presence messaging perhaps once to a few times per day.

Thus, an asset location may be determined in several complementary ways. First, if the asset comprises computing logic, a query can be made to a software application on the asset requesting that the asset report the strongest NFC node signal detected by the asset. The request can be received via the NFC device of the asset from the network of NFC nodes and reported back through the network of NFC nodes. Second, the asset may periodically report an NFC node that is detected with a strongest signal. Alternatively, or in addition, the asset may report or announce when the NFC node presenting the strongest signal changes from a previously detected NFC node with a strongest observed signal. For example, the NFC device of the asset may broadcast an announcement message that is received by the NFC node with the strongest observed signal or other NFC node in the vicinity of the asset. The NFC node may then broadcast a message for delivery to the server notifying of the change for the asset. In another example, NFC nodes in the network may periodically query for nearby assets (and mobile communication devices). If an asset (and/or mobile communication device) is detected, an NFC node may broadcast a message to the server reporting an identity of the NFC node and the detection of the asset (and/or mobile communication device) by the NFC node. For instance, this arrangement may be suitable for use when an NFC device of the asset comprises an NFC tag with limited capabilities, e.g., one that does not include hardware and logic to detect NFC nodes, measure signal strengths, collect asset status information, and so forth. Notably, in each of the foregoing examples the server receives a message that is propagated by an NFC node that may be consider to be the closest NFC node to the asset. Once the message is received by the server, the server may then update the asset's current location and any other information received in the message in an asset tracking database.

In addition to the foregoing, the location of an asset can be tracked over a period of time to determine where the assets spends the greatest percentage of time, the percentage of time that the equipment is actually being used, and so forth. Moreover, the present disclosure is not limited to locating medical equipment in a hospital or other medical facility. For instance, another example of the present disclosure may relate to tracking of testing equipment in a manufacturing facility, e.g., a spectrum analyzer. In accordance with the present disclosure, any mobile/portable physical asset equipped with an NFC device deployed in any environment with a mesh network of NFC nodes as described herein may be tracked. In one example, NFC nodes, including hub NFC nodes, may also comprise multi-sensor devices or may be connected to one or more sensors for recording physical parameters of an environment. For instance, an NFC node may include or be connected to light sensors, temperature sensors, motion sensors, and the like, where sensor data from these sensors may also be routed to the server through the network of NFC nodes. In one example, the asset may also be configured to collect and transmit through the network of NFC nodes various operating parameters of the asset, measurements/readings of various physical parameters in the environment of the asset, such as a temperature, a light level, which may indicate whether the asset is in a room that is occupied, and so forth. This additional information may therefore be received by the server via broadcast messages traversing the network of NFC nodes and stored in a database entry for the asset.

Examples of the present disclosure enable rapid identification of the location and status of a movable asset, and provide contact information for communication devices of users who may have the asset or who may be near the asset, such that the asset can be quickly retrieved. For example, hospitals may have finite numbers of very expensive equipment, some of which is life-saving equipment needed on an emergency basis. The equipment could be used efficiently around the hospital, but due to the risk of not being able to find the equipment during an emergency, the equipment may typically be kept in one location only, even if it is seldom used there. This represents time delays for patients and lost revenue for the hospital. Thus, examples of the present disclosure enable more efficient use of such equipment and timely deployment of such equipment through a server providing a rapid query/response service in connection with a network of NFC nodes deployed throughout an environment. These and other aspects of the present disclosure are discussed in greater detail below in connection with the example FIGS. 1-3.

Figure 1:
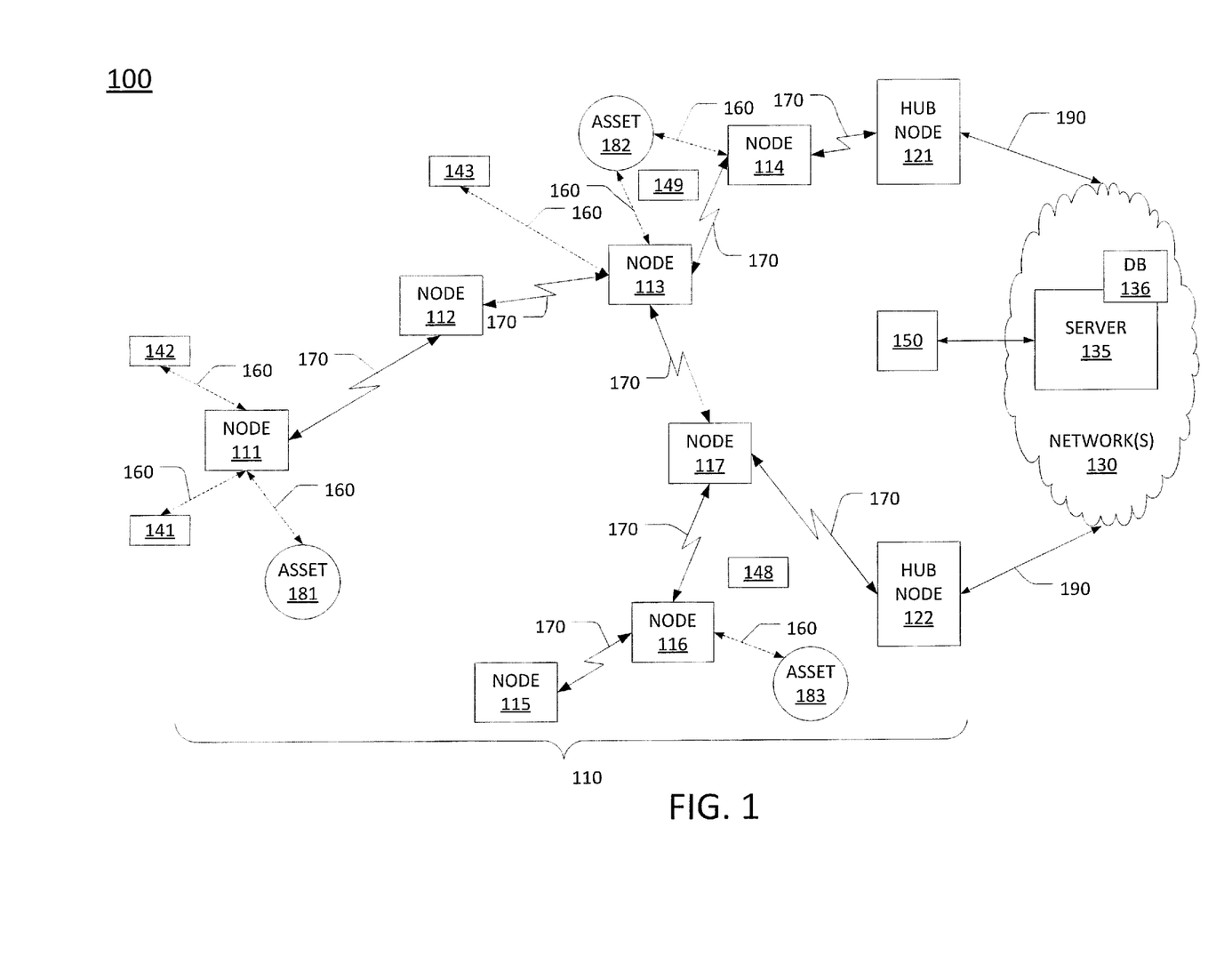
FIG. 1 illustrates an example network related to the present disclosure.

To aid in understanding the present disclosure, FIG. 1 illustrates in greater detail an example network 100 that is suitable for use in connection with processing a query for a physical asset, according to the present disclosure. Although the present disclosure is discussed below in the context of a particular system or network architecture, the present disclosure is not so limited. Namely, the present disclosure can be applied to any type of communication network that is capable of transmitting data, such as a local area network (LAN), a wireless local area network (WLAN), an Internet Protocol (IP) network, such as an Internet Protocol/Multi-Protocol Label Switching (IP/MPLS) core network, an IP Multimedia Subsystem (IMS) network, communications over the Internet in general, and so forth.

As shown in FIG. 1, the network 100 includes a network 110 comprising NFC nodes 111-117 and hub nodes 121-122, and a server 135 that is deployed in and/or accessible via one or more networks 130. In one example, the network 110 may comprise a network of a building, such as a hospital or other medical facility, a manufacturing facility, an office building, a school or other educational institution, and so forth. The network 110 may also comprise a network deployed across multiple buildings, e.g., an office or university campus, an assisted living development, a theme park, and so forth. In FIG. 1, the server 135, e.g., a databases server, is illustrated as being deployed in one or more networks 130. The one or more networks 130 are intended to reflect that the server may be deployed in a local network, e.g., in a same building as the network 110, or may be deployed remote from network 110. For instance, server 135 may be deployed in a telecommunication service provider network, where asset tracking via network 110 may be provided as a service, e.g., in addition to other telecommunication services, such as cellular and non-cellular voice services, data services, e.g., Internet access, television services, etc. In another example, server 135 may be deployed in a network of a third-party service provider (e.g., one that does not provide telecommunication services) that is accessible over the Internet in general, via a virtual private network (VPN) or the like that is leased from a telecommunication service provider, and so forth. In this regard, the one or more networks 130 may comprise Internet Protocol (IP) networks which are capable of routing and forwarding IP packets between different hosts. However, in one embodiment, the components of the one or more networks 130 may have additional functions, e.g., for functioning as a public land mobile network (PLMN)-General Packet Radio Service (GPRS) core network, for providing Voice over Internet Protocol (VoIP), Service over Internet Protocol (SoIP), and so forth, and/or may utilize various different technologies, e.g., Asynchronous Transfer Mode (ATM), Frame Relay, multi-protocol label switching (MPLS), and so forth. Thus, it should be noted that the one or more networks are not limited to IP functions, nor are the functions limited to any particular network layer.

Server 135 may maintain a database (DB) 136 for storing various parameters relating to NFC nodes in network 100 and for tracking locations of physical assets and mobile communication devices. Parameters relating the NFC nodes may include an identifier (ID) of the NFC node, a deployed location of the NFC node, e.g., room 323 on floor 3 of building A, a list of one or more closest communication devices, e.g., a wired/fixed phone in a room of the NFC node, a nearby phone station on a same hallway as the NFC node, and so forth. A list of one or more mobile communication devices detected by an NFC node may also be stored in connection with a database record for an NFC node. In one example, an asset location as recorded in database 136 may comprise an identification of a closest NFC node and/or an NFC node with a strongest signal detected by the asset. The record may further include a location of the NFC node. For instance, a record in the database for the NFC node may be cross-referenced to determine the location in which the NFC node is deployed. This location may then be included in a record for a current location of the asset. In one example, server 135 may also store in database 136 additional information regarding assets and mobile communication devices, such as an asset status, environmental conditions near an asset, whether a user of a mobile communication device is "available" or "unavailable," and so forth. In one example, the server 135, including database 136, may take the form of device 300 illustrated in FIG. 3 and described in greater detail below.

NFC nodes 111-117 and hub nodes 121-122 in the network 110 may comprise NFC transceivers for communicating with one another using NFC broadcast messages via NFC links 170. The messages may include messages that are originated by one of the NFC nodes 111-117 or messages that are originated by server 135. An NFC node that receives a message that was not originated by the NFC node may rebroadcast the message, such that the message is received by all NFC nodes in the network 110, in the case of a message originated by the server 135, or such that the message is received by one of the hub servers 121-122, in the case of a message originated by one of the NFC nodes 111-117. The maximum number of rebroadcasts of a message may be capped in various ways, as described above.

NFC nodes 111-117 may also communicate with assets 181-183 via NFC links 160. In one example, assets 181-183 may be equipped with respective NFC devices to enable communications via NFC links 160. The NFC devices of assets 181-183 may comprise NFC transceivers, NFC passive or active tags, and so forth. In one embodiment, mobile communication devices 141-143 may comprise any endpoint devices configured for wireless communication such as a personal computer, a laptop computer, a Wi-Fi device, a Personal Digital Assistant (PDA), a mobile phone, a smartphone, an email device, a computing tablet, a messaging device, and the like. In one embodiment, any or all of mobile communication devices 141-143 may have both cellular and non-cellular access capabilities and may further have wired communication/networking capabilities. Notably, each of mobile communication devices 141-143 may also run an application which enables interactions with NFC nodes for receiving identification requests and for sending response messages via an NFC device, e.g., a transceiver, of each mobile communication device 141-143. For example, mobile communication devices 141-143 may comprise devices associated with users throughout a facility who may be contacted for assistance in locating and retrieving assets. In one example, the mobile communication devices 141-143 may take the form of device 300 illustrated in FIG. 3 and described in greater detail below.

In one example, communications between NFC nodes and assets and between NFC nodes and mobile communication devices over NFC links 160 may be distinguished from communications over NFC links 170 insofar as the communications over NFC links 160 are not for rebroadcasting. For instance, NFC node 111 may broadcast a first type of message seeking to detect any nearby assets and/or mobile communication devices (within NFC detection range). Asset 181, which is nearby, may therefore receive and respond to the message. Mobile communication devices 141-142 may also receive and respond to the message. Since the message is broadcast by NFC node 111, the message may also be received by NFC node 112. However, since the purpose of the message is for NFC node 111 to detect nearby assets and mobile communication devices, NFC node 112 may simply ignore this message. It is also possible that the responses from asset 181 and mobile communication devices 141-142 may be received by NFC node 112. NFC node 112 may also ignore these communications. However, after receiving a response message from asset 181, NFC node 111 may generate and broadcast a message of a second type that is intended for server 135, indicating that NFC node 111 detected asset 181. If NFC node 111 also receives responses from mobile communication devices 141 or 142, the NFC node 111 may also indicate the detection of the mobile communication device in the same message or in one or more additional messages. Any such messages may also be received by NFC node 112. Since these messages are intended for delivery to server 135, NFC node 112 may rebroadcast these messages.

Hub nodes 121-122 may be tasked with relaying communications between NFC nodes 111-117 and server 135 via non-NFC links 190 over the one or more networks 130. Thus, hub nodes 121 and 122 may also include NFC transceivers for receiving and transmitting NFC messages. For instance, hub nodes 121-122 may be deployed in strategic locations in a building and receive broadcast messages from various NFC nodes in the network 110. In the example of FIG. 1, NFC nodes 114 and 117 are within NFC transmission/reception range of hub nodes 121 and 122, respectively via NFC links 170. Thus, regardless of which NFC node originates a broadcast message, the message may be received and rebroadcast by one or both of NFC nodes 114 and 117, which is then received by one or both of hub nodes 121 and 122 via NFC links 170. Hub nodes 121-122 may then pass the message via non-NFC links 190 to server 135. Conversely, hub nodes 121-122 may receive messages from server 135 that are intended for broadcast and/or are intended for delivery to a particular NFC node, asset or mobile communication device. For instance, the server 135 may provide a message to one or both of hub nodes 121-122 via non-NFC links 190 seeking to locate asset 181. Hub nodes 121-122 may then broadcast the message via NFC transmissions. In the example, of FIG. 1, the message may be received by NFC nodes 114 and 117, respectively via NFC links 170. The NFC nodes 114 and 117 may rebroadcast the message, which may then be rebroadcast by any receiving NFC nodes, and so on, until the message has been rebroadcast a maximum number of times, until a defined period of time has passed since the message was first broadcast, etc. In one example, hub nodes 121-122 may also have dual functions of relaying communications between NFC nodes 111-117 and server 135 via non-NFC links 190 and for operating as additional NFC nodes in the network 110. For instance, hub nodes 121-122 may detect assets and mobile communication devices in the respective vicinities in the same or a similar manner as NFC nodes 111-117.

Several additional examples of asset tracking may be further illustrated in connection with the network 100 of FIG. 1. As described above, asset tracking may involve a server querying NFC nodes for an asset location, assets self-reporting locations periodically via the NFC nodes and/or when a change in location is detected, NFC nodes periodically detecting assets in the vicinity of the respective NFC nodes and reporting any detections to the server 135, and so forth.

In one example, the server 135 may receive a query from a user device 150. The query may include a request for asset 182. The server 135 may generate a message for the network 110 of NFC nodes 111-117 and hub nodes 121-122 to locate the asset 182, and send the message to hub nodes 121-122 via non-NFC links 190. Hub nodes 121-122 may broadcast the message via NFC links 170. The message may be received and rebroadcast by NFC nodes 114 and 117. The message may further be received and rebroadcast by NFC nodes 113 and 116, NFC nodes 112 and 115, and NFC node 111 via various NFC links 170. NFC nodes receiving the message may then act in response to the message to determine whether asset 182 can be detected. For example, the NFC nodes 111-117 and hub nodes 121-122 in network 110 may transmit messages requesting nearby assets to respond, or requesting that asset 182 respond if it receives the message. In this example, NFC nodes 113 and 114 may receive respective responses from asset 182, which is located near both of these NFC nodes. NFC nodes 113 and 114 may then generate and broadcast response messages for server 135 and broadcast the respective messages via NFC links 170. These messages may be rebroadcast by various NFC nodes in the network 110, eventually reaching hub nodes 121 and/or 122 where the messages are then passed to server 135 via non-NFC links 190. The server 135 may then respond to the device 150 that the location of the asset is near NFC nodes 113 and 114. In one example, the server 135 may refer to database 136 to determine room numbers or other location information of NFC nodes 113 and 114 respectively, and provide this information in the response sent to device 150. In one example, the database 136 may also include in a record for NFC node 114 a telephone number or extension of a communication device 149 near NFC node 114. In one example, communication device 149 may comprise a substantially fixed-location telephone, IP phone, a computer functioning as a softphone, or a similar device, e.g., deployed at a nurse's station in a hospital, at a manger's desk in a manufacturing facility, etc., for receiving calls to assist in locating and retrieving various tracked assets. Similarly, database 136 may also include within a record for NFC node 113 that mobile communication device 143 has been detected in the vicinity. Thus, a phone number of mobile communication device 143 may also be provided in the response to the device 150.

In another example, asset 183 may detect that is has been moved from a location near NFC node 115 to a location near NFC node 116. For instance, asset 183 may periodically detect broadcasts by NFC nodes in the network 110 and determine the received signal strengths. In some cases, the asset may detect only a single NFC node. In other cases, multiple NFC nodes may be detected. Therefore, an NFC node with the highest received signal strength may be determined to be the closest NFC node and reported to the server 135. In the present example, asset 183 may determine at a first time that NFC node 115 has a highest received signal strength. At a later time, asset 183 may determine that the received signal strength from NFC node 115 has fallen (or dropped below a noise threshold and can no longer be detected), while the received signal strength of NFC node 116 has increased and is now greater than the received signal strength of NFC node 115. Thus, asset 183 may transmit a message via an NFC link 160 indicating that it has detected a location change to near NFC node 116. NFC node 116 may receive this message indicating a change in location of asset 183, and generate a broadcast message for server 135. The message may be received by intermediate NFC nodes in the network 110 before reaching hub servers 121 and 122 for sending to server 135 via non-NFC links 190. Server 135 may then update the location of asset 183 in a record in database 136 for the asset 183. At a later time, a query for asset 183 may be received by server 135 from device 150.

The server 135 may then respond with the location of asset 183 as stored in database 136. For instance, the response to the query may indicate that the location of asset 183 is near NFC node 116 which is deployed in room 202 on floor 2. In addition, the server 135 may refer to database 136 in response to the query and determine any communication devices that are associated with NFC node 116. In this case, a fixed communication device 148 may be deployed in the same room as NFC node 116, and a phone number of the fixed communication device 148 may be stored in an entry for NFC node 116 in the database 136. Thus, the phone number may also be provided to device 150 in response to the query.

In still another example, NFC nodes 111-117 may periodically query the environment to request identifications of any assets and/or mobile communication devices within NFC range via one of NFC links 160. Assets or mobile communication devices receiving these messages may respond to the respective requesting NFC nodes. The NFC nodes may then send broadcast messages intended for delivery to server 135 indicating any assets and/or mobile communication devices that are detected. In one example, an NFC node may send a message to server 135 when an asset or mobile communication device is newly detected, or when a previously detected asset or mobile communication device is no longer detected. For instance, NFC node 111 may query the environment via NFC links 160 and receive responses from asset 181 and from mobile communication devices 141 and 142. Asset 181 and mobile communication device 141 may previously have been detected and reported to server 135. Mobile communication device 142 may be detected for the first time. Thus, in the present example, NFC node 111 may broadcast a message indicating the detection of mobile communication device 142. However, notification of the detection of mobile communication device 141 and asset 183 may be omitted to reduce the size of the message, since there is no change in location to report regarding mobile communication device 141 and asset 183. The message may be received and rebroadcast by NFC nodes 112, 113 and 114, respectively. Hub node 121 may receive the message from NEC node 114 and forward the message to server 135 via non-NFC link 190. Server 135 may then record the change in location for mobile communication device 142 in the database 136. For example, a record for NFC node 111 may include a list of nearby mobile communication devices. Thus, mobile communication device 142 may be added to the list. Upon receiving a query from device 150 for asset 181, the server 135 may look up the record for asset 181 in the database 136 and determine that it is located near NFC node 111. Server 135 may further check an entry for NFC node 111 to determine any nearby communication devices, more detailed location information for NFC node 111, e.g., a building number, a room number, a floor number, etc., and so on. Server 135 may then provide a response to the query with the location of asset 181, e.g., using the location of NFC node 111 as a proxy, and any additional information, including contact information for mobile communication devices 141 and 142, for example.

The above network 100 is described to provide an illustrative environment in which embodiments of the present disclosure may be employed. In other words, the network 100 is merely illustrative of one network configuration that is suitable for implementing embodiments of the present disclosure. Thus, the present disclosure may also include any other different network configurations that are suitable for implementing embodiments of the present disclosure, for conveying communications among NFC nodes, hub nodes, servers, requesting devices, assets, mobile communication devices, and so forth. In particular, embodiments of the present disclosure may be implemented in any wired or wireless communication environment and may implement any communication technologies and protocols that enable devices to communicate, including: a cellular network, a wired and/or wireless local area network, a wide-area network, a wireless short-range peer-to-peer or mesh network, a satellite-based communication network, and internet service provider access network, a layer 3 transport network, a combination of one or more of the foregoing network types, and so forth. Various modifications to the network 100 are also possible in accordance with the present disclosure. For instance, server 135 may field requests from multiple requesting devices. Additional assets, NFC nodes and communication devices may be tracked by server 135. Server 135 and/or database 136 may be distributed across multiple physical devices in a same location or in different locations, and so forth. In one example, hub nodes may be omitted and server 135 may include an NFC transceiver for broadcasting and receiving messages via network 110. The foregoing are only a few example modifications of network 100 that are possible. Thus, the network 100 may be expanded by including additional devices, networks, network elements, application servers, etc., or alerted by omitting various elements from network 100, or modifying or substituting elements illustrated in FIG. 1 with different elements, without altering the scope of the present disclosure.

Figure 2:
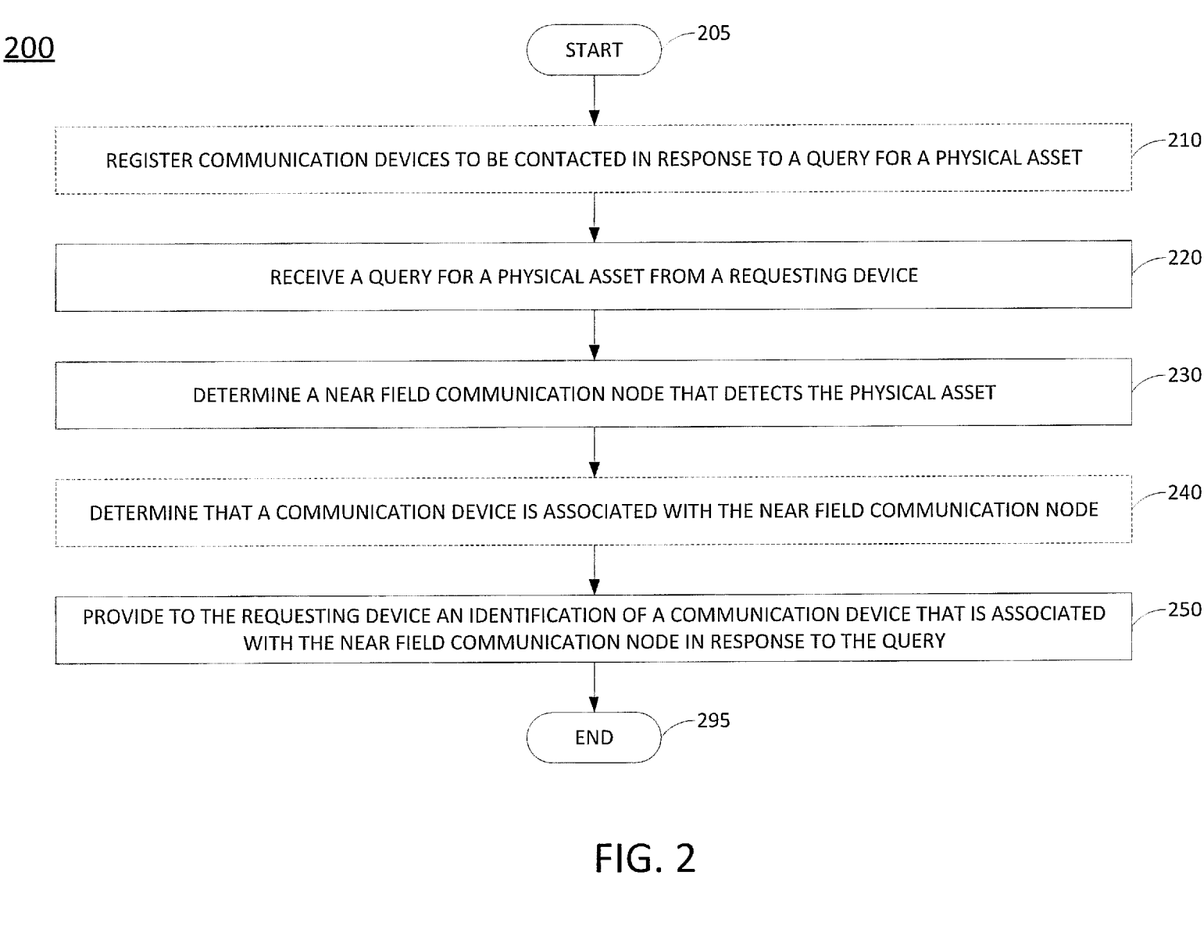
FIG. 2 illustrates a flowchart of an example method of the present disclosure for processing a query for a physical asset.

FIG. 2 illustrates a flowchart of an example method 200 of the present disclosure for processing a query for a physical asset. In one example, the method 200 is performed by a server, such as such as server 135 in FIG. 1. Alternatively, or in addition, the steps, functions, or operations of the method 200 may be performed by a device or system 300, and/or processor 302 as described in connection with FIG. 3 below, specifically programmed to perform the steps, functions and/or operations of the method. For illustrative purposes, the method 200 will now be described in terms of an embodiment where steps of the method are performed by a processor, such as processor 302 in FIG. 3.

Method 200 starts in step 205 and may proceed to optional step 210. In optional step 210, the processor may register communication devices to be contacted in response to a query for a physical asset. For instance, the processor may register mobile communication devices of various users that may be required or willing to be available to assist in locating and/or retrieving physical assets. In one example, the user of a mobile communication device may submit a registration via an application interface on the mobile communication device. The registration may include a telephone number of the mobile communication device, the user's name, the user's role in an organization, e.g., doctor, nurse, facility operations, technician, hospital administration, and so forth. At the same time or at a later time, a user may also register a schedule of when the user is available (or unavailable). In addition, a user may also update an available/unavailable status at any time by submitting an availability status update through the mobile communication device or via another device. For instance, several hospital staff may be assisting in a surgery on a patient and although within the hospital, should not be interrupted even to help look for an asset that may be needed by another surgical team. Thus, processor may register their respective mobile communication devices as being "unavailable" upon receiving status updates from the respective mobile communication devices.

In step 220, the processor receives a query for a physical asset from a requesting device. The requesting device may be a mobile communication device, a desktop computing device, a tablet computing device, and so forth. The query may identify a particular physical asset that the requestor is seeking, or may identify a class of physical assets. For instance, the requestor may be seeking a forklift and does not care which particular forklift of several available forklifts the requestor can obtain first. In one example, the requestor may provide a location of the requestor or a different location in the query. For instance, the query may request a closest available physical asset to the location that is provided.

In step 230, the processor determines a near field communication (NFC) device that detects the physical asset. For instance, the processor may connect to a network of NFC nodes for tracking physical assets and mobile communication devices in an environment, such as a hospital, manufacturing facility, a campus, and so forth. In one example, step 240 may comprise accessing a record for the physical asset from a database storing records for physical assets, NFC nodes, and mobile communication devices. For instance, the record for the physical asset may include an identification of an NFC node where the physical asset was most recently detected, an identification of an NFC node detecting a highest signal strength from the physical asset (e.g., from an NFC device of the physical asset), or an identification of an NFC node for which the physical asset detected a highest signal strength, and so forth. In one example, the record may include a list of NFC nodes. For instance, the physical asset may be located between two NFC nodes, both of which detect the asset. Thus, a list comprising a first NFC node detecting a highest signal strength from the physical asset and a second NFC node detecting a second highest signal strength from the physical asset may be included in the record. In another example, a list may simply include a plurality of NFC nodes that detect the physical asset, without differentiating between signal strengths. For instance, certain NFC transceivers operate at low power and over relatively short distances. Thus, it may be assumed that any NFC node detecting the physical asset is proximate to the physical asset for purposes of the present disclosure.

In one example, the record for the asset is updated by the network of NFC nodes periodically querying the environment for nearby assets. If an NFC node detects an asset, e.g., by receiving a response from the asset, the NFC node may broadcast a message for delivery to the processor identifying the asset or assets that the NFC node detects. In one example, an NFC node may broadcast such a message when a physical asset is newly detected. In other words, if the NFC node has previously detected a physical asset and reported the detection to the processor via a broadcast message, the NFC node may omit notifying the processor of a subsequent detection of the same physical asset. In another example, an NFC device of a physical asset may periodically query an environment or may listen to messages that are broadcast and rebroadcast by NFC nodes in the network in order to detect any nearby NFC nodes. The physical asset may then send an announcement message via the NFC device identifying the NFC node for which a highest signal strength is observed or identifying multiple NFC nodes that were detected. In one example, the NFC node having the highest signal strength that is detected and that is identified in the announcement message may receive the announcement message and generate a broadcast message for delivery to the processor identifying that the NFC node is the closest NFC node to the physical asset.

In still another example, step 230 may comprise the processor propagating a request message to the network of NFC nodes to locate the physical asset, or a class of assets to which the physical asset belongs. The processor may broadcast the message via an NFC transmission to the network of NFC nodes, or may pass the message to one or more NFC hub nodes for propagation to other NFC nodes in the network via NFC transmissions. Any NFC node in the network that receives such a message may rebroadcast the message for other NFC nodes. Any NFC node in the network that receives such a message may also broadcast a message requesting that the physical asset or any asset in a class of physical assets respond to the message. If the physical asset is within detection range of the NFC node, the physical asset may send a response confirming a presence of the physical asset near the NFC node. The NFC node may then broadcast a message for delivery to the processor indicating that the NFC node has detected the physical asset. The processor may receive such a message via one or more rebroadcasts by additional NFC nodes in the network and/or via a non-NFC link from a hub NFC node. The processor may then update a location of the physical asset in a record for the physical asset in the database. For instance, the identification of the NFC node may be used as proxy for the location of the physical asset. In another example, the processor may access a record of the NFC node in the database, determine a location of the NFC node from the record of the NFC node, e.g., room 202 on floor 2, and copy the location to the record for the physical asset.

In any of the foregoing examples, the processor may further be receive status information of the asset, such as whether the asset is in use, a battery level of the asset, and so forth, and store such status information in the record for the physical asset in the database. For instance, the physical asset may report the status of the physical asset in any message to a nearby NFC node (e.g., whether self-initiated, generated in response to a query from the NFC node, etc.). The NFC node may then include in a broadcast message any status information of the physical asset, e.g., in addition to reporting the detection of the physical asset for purposes of tracking the location of the physical asset. As mentioned above, the query for the physical asset received at step 220 may also comprise a query for a class of physical assets. Thus, in one example, step 230 may comprise determining one or more NFC nodes that detect one or more physical assets in the class of physical assets.

In optional step 240, the processor determines that a communication device is associated with the NFC node. In one example, optional step 240 may comprise accessing a record for the NFC node in the database to determine that the communication device is associated with the NFC node. In one example, the communication device associated with the NFC node may be a mobile communication device that is registered at optional step 210. The mobile communication device may include a NFC device, e.g., a transceiver, for interacting with NFC nodes in the network. In one example, the NFC node may broadcast an NFC message to identify any nearby mobile communication devices, receive a response from the NFC device of the mobile communication device, and broadcast a message for delivery to the processor indicating that the mobile communication device was detected by the NFC node. The processor may then associate the mobile communication device with the NFC node by including an identifier of the mobile communication device in a database entry for the NFC node.

In another example, the communication device may comprise a non-mobile communication device, such as a telephone installed in a same room as the NFC node, in a hallway near the NFC node, and so forth. In this regard, the association between the NFC node and the communication device may be created by a user, e.g., an administrator, providing the association to be stored in the database. For instance, when the NFC node is deployed in a location, the location of the NFC node and an identification of any nearby fixed communication devices and their respective locations may be entered into the database. Thus, at optional step 240, the processor may access the database record for the NFC node to determine any associated communication devices, whether mobile or non-mobile, that are contained in the record.

In step 250, the processor, provides the requesting device with an identification of a communication device that is associated with the NFC device in response to the query that is received at step 220. In one example, the communication device may comprise a fixed or mobile communication device that is determined at optional step 240. The identification of the communication device may comprise a telephone number or extension number of the communication device, a name of a user of the communication device, a role of the user within an organization, and so forth. In one example, the processor may check an availability status of the communication device to determine whether the user may be contacted at the communication device. For instance, a user of the communication device may have previously provided a schedule that indicates the user is unavailable or may have sent an update to indicate the user is unavailable. If the communication device is associated with the NFC node but the status of the user/communication device is presently "unavailable" the processor may omit this particular communication device at step 250. For instance, if several communication devices are associated with the NFC node, other communication devices of users having a status of "available" may be provided at step 250.

In addition to the foregoing, the processor may also provide an identification of the NFC node, and one or more additional NFC nodes. For instance, the record for the asset may indicate a closest NFC node and/or a highest signal strength NFC node, a location of the NFC node, and so forth, e.g., in addition to contact information for a communication device associated with the NFC node. In one example, multiple NFC nodes detecting the physical asset may be included in a record for the physical asset. Accordingly, in one example, identifications of multiple NFC nodes and/or the locations of the NFC nodes may be provided by the processor. In one example, the processor may provide a ranked list of NFC nodes to the requesting device, e.g., ordered by an observed signal strength of the NFC node and/or the NFC device of the physical asset.

In one example, at step 250 the processor may further provide a ranked list of physical assets to the requesting device. For instance, the query for the physical asset received at step 220 may comprise a query for a class of physical assets. Likewise, step 230 may comprise determining one or more NFC nodes that detect one or more physical assets in the class of physical assets. In one example, statuses of the physical assets may also be determined at step 230, such as whether the assets are in use, battery levels of the assets, and so forth, and such status information stored in the record for the physical asset in the database Accordingly, at step 250 the processor may rank physical assets that are detected by one or more NFC devices according to respective distances from a location specified in the query received at step 220, according to the statuses of the physical assets, and so forth. For instance, a physical asset that is closer to the location but that is in use may be ranked lower that a physical asset that is further away, but that is not in use.

Following step 250, the method 200 proceeds to step 295 where the method ends.

In addition, although not specifically specified, one or more steps, functions or operations of method 200 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 that recite a determining operation or involve a decision do not necessarily require that both branches of the determining operation be practiced. In other words, one of the branches of the determining operation can be deemed as an optional step. Moreover, steps, blocks, functions or operations of the above described method 200 can be combined, separated, and/or performed in a different order from that described above, without departing from the example embodiments of the present disclosure.

As such, the present disclosure provides at least one advancement in the technical field of near-field communication based asset tracking. For instance, in one example, the present disclosure provides a server and a network of NFC nodes for processing queries for physical assets and for providing an identification of a communication device near a NFC node that detects the physical asset. Thus, examples of the present disclosure enable a user to promptly discover the locations and statuses of queried assets, to rank order all assets meeting search criteria based on distance and usage status, and to provide local phone numbers and/or the names and mobile phone numbers of individuals co-located with the assets. Examples of the present disclosure are rapidly deployable at low cost and with a high degree of flexibility to accommodate widely varying indoor and outdoor environments.

The present disclosure also provides a transformation of data. For example, database records for NFC nodes and physical assets being tracked via a network of the NFC nodes are altered and updated on an ongoing basis as physical assets and mobile communication devices move throughout an environment. In addition, physical asset identification data and other data, such as status information of various physical assets is collected from various NFC devices and translated into recommended communication devices to contact to assist in locating and retrieving a physical asset. Physical asset identification data and other data may also be used to create new ranked orderings of physical assets of a particular class on an ongoing basis.

Finally, embodiments of the present disclosure improve the functioning of a computing device, e.g., a server. Namely, a new type of server for processing a query for a physical asset is provided, e.g., a server for receiving a query for a physical asset from a requesting device, determining a near field communication node that detects the physical asset, and providing to the requesting device an identification of a communication device that is associated with the near field communication node in response to the query. Notably, no previous server has performed these functions as described herein.

Figure 3:
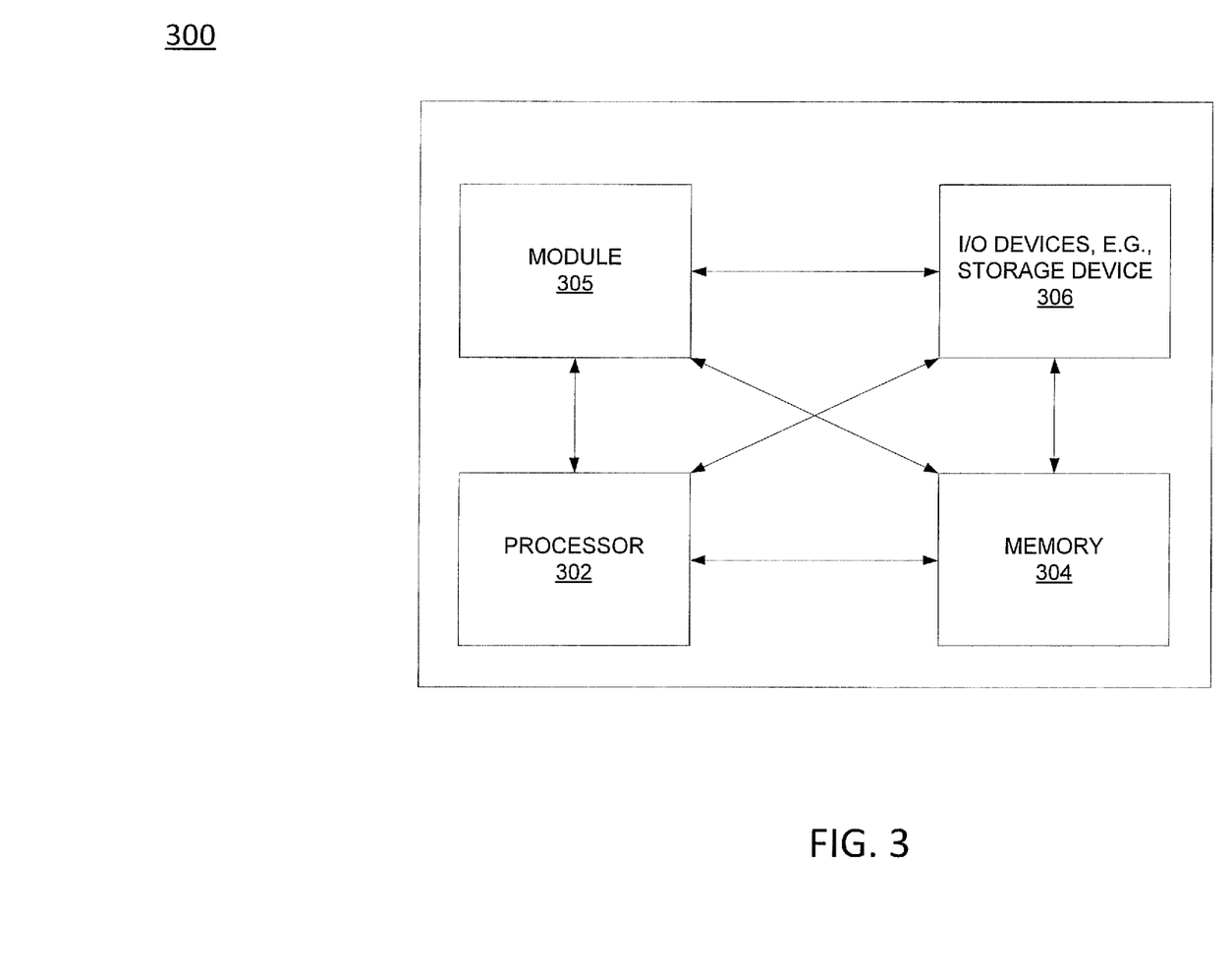
FIG. 3 illustrates a high-level block diagram of an example computing device programmed to perform the steps, functions, operations or methods described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for processing a query for a physical asset, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 302 can also be configured or programmed to cause other devices to perform one or more operations as discussed above. In other words, the one or more hardware processors 302 may serve the function of a controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 305 for processing a query for a physical asset (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer-readable or software instructions relating to the above described methods can be perceived as a programmed processor or a specialized processor. As such, the present module 305 for processing a query for a physical asset (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described examples, but should be defined only in accordance with the following claims and their equivalents.

What is claimed is:

1. A device comprising:
   a processing system including at least one processor; and
   a computer-readable medium storing instructions which, when executed by the processing system, cause the processing system to perform operations, the operations comprising:
      sending a query for a physical asset to an application server;
      receiving from the application server an identification of a communication device, wherein the communication device is a mobile communication device, wherein the application server has determined that the communication device is associated with a near field communication node that has detected the physical asset and has detected the communication device, and wherein the communication device was previously registered as being available to be contacted in connection with queries for physical assets; and
      contacting the communication device responsive to the identification.

2. The device of claim 1, wherein the physical asset comprises a near field communication device.

3. The device of claim 2, wherein the near field communication node detected the physical asset via the near field communication device of the physical asset.

4. The device of claim 2, wherein the near field communication device is attached to the physical asset.

5. The device of claim 3, wherein the physical asset being detected comprises the application server having received a message from the near field communication node indicating a detection of the near field communication device of the physical asset.

6. The device of claim 1, wherein the physical asset being detected comprises the application server having received a message from the near field communication node indicating a detection of the physical asset.

7. The device of claim 6, wherein the message is received via a near field communication transmission.

8. The device of claim 7, wherein the message is received via at least one additional near field communication node, and wherein the at least one additional near field communication node rebroadcasts the message via at least one additional near field communication transmission.

9. The device of claim 8, wherein the message is further received via a near field communication hub node, and wherein the message is sent by the near field communication hub node via a non-near field communication link.

10. The device of claim 8, wherein the at least one additional near field communication node comprises a plurality of near field communication nodes, and wherein the plurality of near field communication nodes is configured to rebroadcast the message a maximum number of times before discarding the message.

11. The device of claim 8, wherein the at least one additional near field communication node rebroadcasts the message when a time period since a creation of the message does not exceed a threshold.

12. The device of claim 8, wherein the at least one additional near field communication node rebroadcasts the message when the at least one additional near field communication node has not previously rebroadcast the message.

13. The device of claim 1, wherein the application server having determined that the communication device is associated with the near field communication node that has detected the communication device comprises the application server having received the identification of the communication device from the near field communication node.

14. The device of claim 13, wherein the communication device comprises a near field communication transceiver, and wherein the near field communication node detects the communication device by detecting the near field communication transceiver of the communication device.

15. The device of claim 1, wherein the query for the physical asset comprises a query for a class of physical assets that includes the physical asset, and wherein the identification further comprises a ranked list of physical assets of the class of physical assets.

16. A non-transitory computer-readable medium storing instructions which, when executed by a processing system including at least one processor, cause the processing system to perform operations, the operations comprising:
    sending a query for a physical asset to an application server;
    receiving from the application server an identification of a communication device, wherein the communication device is a mobile communication device, wherein the application server has determined that the communication device is associated with a near field communication node that has detected the physical asset and has detected the communication device, and wherein the communication device was previously registered as being available to be contacted in connection with queries for physical assets; and
    contacting the communication device responsive to the identification.

17. A method comprising:
    sending, by a processing system including at least one processor, a query for a physical asset to an application server;
    receiving, by the processing system, from the application server an identification of a communication device, wherein the communication device is a mobile communication device, wherein the application server has determined that the communication device is associated with a near field communication node that has detected the physical asset and has detected the communication device, and wherein the communication device was previously registered as being available to be contacted in connection with queries for physical assets; and
    contacting, by the processing system, the communication device responsive to the identification.

18. The method of claim 17, wherein the physical asset comprises a near field communication device.

19. The method of claim 18, wherein the near field communication node detected the physical asset via the near field communication device of the physical asset.

20. The method of claim 17, wherein the query for the physical asset comprises a query for a class of physical assets that includes the physical asset, and wherein the identification further comprises a ranked list of physical assets of the class of physical assets.

\* \* \* \* \*